(12) United States Patent
Fowler et al.

(10) Patent No.: US 11,885,177 B2
(45) Date of Patent: Jan. 30, 2024

(54) SLAT ASSEMBLY

(71) Applicant: Oakmoore Pty Ltd, Salisbury (AU)

(72) Inventors: Shane Fowler, Salisbury (AU); Wolfgang Schollhammer, Salisbury (AU); Shaun Kettlety, Salisbury (AU)

(73) Assignee: Oakmoore Pty Ltd, Salisbury (AU)

( * ) Notice: Subject to any disclaimer, the term of this patent is extended or adjusted under 35 U.S.C. 154(b) by 475 days.

(21) Appl. No.: 17/058,302

(22) PCT Filed: May 22, 2019

(86) PCT No.: PCT/AU2019/050497
§ 371 (c)(1),
(2) Date: Nov. 24, 2020

(87) PCT Pub. No.: WO2019/227135
PCT Pub. Date: Dec. 5, 2019

(65) Prior Publication Data
US 2021/0189793 A1    Jun. 24, 2021

(30) Foreign Application Priority Data

May 31, 2018   (AU) ................................ 2018901949

(51) Int. Cl.
*E06B 9/15*   (2006.01)
*B60J 7/04*   (2006.01)
*E06B 9/58*   (2006.01)

(52) U.S. Cl.
CPC ................ *E06B 9/15* (2013.01); *B60J 7/041* (2013.01); *E06B 9/58* (2013.01); *E06B 2009/1522* (2013.01); *E06B 2009/1544* (2013.01)

(58) Field of Classification Search
CPC ...... E06B 9/15; E06B 9/58; E06B 2009/1522; E06B 2009/1544; E06B 2009/1505;
(Continued)

(56) References Cited

U.S. PATENT DOCUMENTS 4,972,894 A * 11/1990 Machill ..................... E06B 9/17
160/235
4,979,553 A * 12/1990 Lowry, III .............. E06B 9/165
160/133

(Continued)

FOREIGN PATENT DOCUMENTS

EP       3026206 A1 *  6/2016
JP       11152972 A *  6/1999
(Continued)

OTHER PUBLICATIONS

International Search Report and Written Opinion for PCT/AU2019/050497 dated Jul. 2, 2019 (7 pages).

*Primary Examiner* — Beth A Stephan
(74) *Attorney, Agent, or Firm* — Oakmoore Pty Ltd

(57) ABSTRACT

A slat assembly for a roll top cover enables an improved sealing arrangement and reduced frictional forces. The assembly includes: a plurality of successive and interconnected slats, each of the slats comprising opposed and adjoining first and second ends and upper and lower surfaces; and first and second hinge elements disposed at the respective first and second ends of each slat and integral therewith, the first and second hinge elements configured to define a hinge arrangement that facilitates relative pivotal movement between the slats; wherein the slat assembly is operable between extended and retracted positions.

13 Claims, 5 Drawing Sheets

(58) Field of Classification Search
CPC ...... E06B 2009/1533; E06B 2009/1538; B60J 7/041; B60J 7/085
See application file for complete search history.

(56) References Cited

U.S. PATENT DOCUMENTS

| | | | | |
|---|---|---|---|---|
| 6,113,176 | A * | 9/2000 | Bernardo | B60J 7/041 296/100.09 |
| 6,682,132 | B1 * | 1/2004 | Hahn | B60J 7/00 296/210 |
| 8,544,934 | B2 * | 10/2013 | Maimin | B60J 7/102 296/100.12 |
| 9,399,391 | B2 * | 7/2016 | Bernardo | B60J 10/277 |
| 10,137,766 | B2 * | 11/2018 | Bernardo | B60J 7/196 |
| 2013/0093206 | A1 * | 4/2013 | Rusher | B60J 7/085 296/100.14 |
| 2013/0106133 | A1 * | 5/2013 | Maimin | B60J 7/1856 296/100.09 |
| 2015/0144276 | A1 * | 5/2015 | Lee | E06B 9/171 160/133 |
| 2019/0301237 | A1 * | 10/2019 | Magro | E06B 9/165 |
| 2020/0353805 | A1 * | 11/2020 | Miaoyi | B60J 11/025 |
| 2022/0144056 | A1 * | 5/2022 | Voetmann | B60J 7/041 |

FOREIGN PATENT DOCUMENTS

| | | | |
|---|---|---|---|
| JP | H11152972 A | | 6/1999 |
| KR | 20190098596 A | * | 8/2019 |
| WO | WO-2021056067 A1 | * | 4/2021 |

\* cited by examiner

SLAT ASSEMBLY

CROSS-REFERENCE TO RELATED APPLICATIONS

This application is a national stage of, and claims priority to, Patent Cooperation Treaty Application No. PCT/AU2019/050497, filed on May 22, 2019, which application claims priority to Australian Patent Application No. AU2018901949, filed on May 31, 2018, which applications are hereby incorporated herein by reference in their entireties.

BACKGROUND

Numerous types of truck bed covers are commonly used over the utility or cargo bed portion of a ute or pickup truck to secure and protect the bed including cargo items disposed therein. In particular, roll top covers generally include a motorized or mechanical drive system for operably covering and uncovering the top of an open cargo bed, truck box or the like by way of an extendable and retractable slat assembly.

Prior art roll top covers can suffer from a number of drawbacks. By way of example, such roll top covers may not be fully weather resistant and/or impervious to moisture and dust. Additionally, the frictional forces that are produced between individual slats during operation (i.e., opening and/or closing) of the roll top cover can be significant so as to make closing and/or opening difficult for a user.

Accordingly, an improved roll cover that overcomes one or more of the above disadvantages is required.

BRIEF DESCRIPTION OF THE DRAWINGS

To assist in understanding the disclosure and to enable a person skilled in the art to put the disclosure into practical effect, description is provided by way of example only with reference to the accompanying drawings, in which.

DETAILED DESCRIPTION

Figure 1:
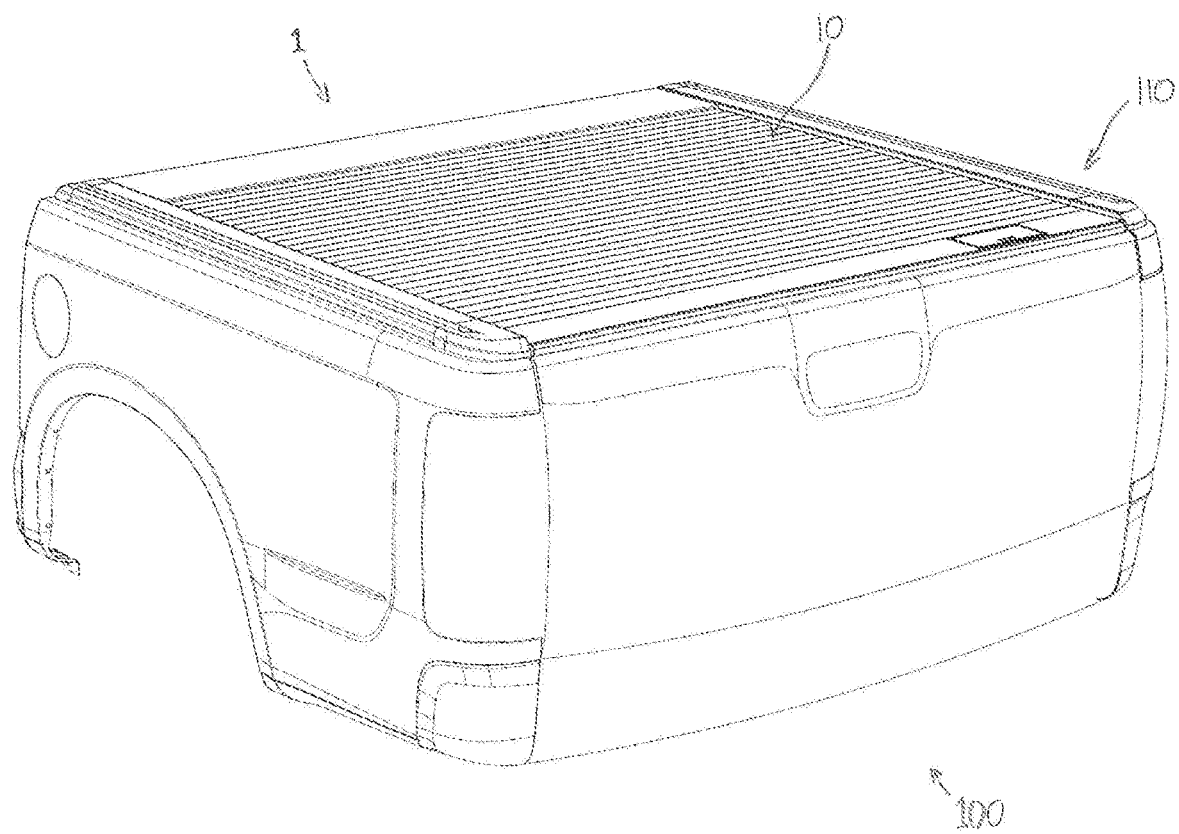
FIG. 1 is a top-down perspective view of a slat assembly included within a roll top cover suitably installed on a vehicle.

The disclosure includes to a slat assembly of a roll cover for a cargo bed of a vehicle, such as pickup trucks and utility vehicles. Elements of the disclosure are illustrated in concise outline form in the drawings, showing only those specific details that are necessary to understand the disclosure, but so as not to provide excessive detail that will be obvious to those of ordinary skill in the art in light of the present description.

In this specification, adjectives such as first and second, top and bottom, upwards and downwards, and the like may be used solely to distinguish one element or action from another element or action without necessarily requiring or implying any actual such relationship or order. Words such as "comprises" or "includes" are intended to define a non-exclusive inclusion, such that a method or apparatus that comprises a list of elements does not include only those elements but may include other elements not expressly listed, including elements that are inherent to such a method or system.

According to a first aspect, although not necessarily the only aspect or the broadest aspect, the disclosure includes a slat assembly for a roll top cover comprising:

a plurality of successive and interconnected slats, each of the slats comprising opposed and adjoining first and second ends and upper and lower surfaces;

first and second hinge elements disposed at the respective first and second ends of each slat and integral therewith, the first and second hinge elements configured to define a hinge arrangement that facilitates relative pivotal movement between the slats;

wherein the slat assembly is operable between extended and retracted positions.

Suitably, the slat assembly further comprises a sealing member disposed within the first end of each of the slats and configured for underlying a junction defined by the respective first and second ends of the slats adjacent thereto. The first end of each of the slats may include a channel disposed between the upper surface and the first hinge element, the channel configured for receiving and securing the sealing member therein.

The second end of each of the slats may include a step portion configured to contact and abut an upper end portion of the sealing member of the slat adjacent thereto.

The sealing member may include one or a plurality of resiliently deformable ridges disposed thereon.

The first or second hinge element may include an arcuate hook portion extending outwardly from the respective first or second end of the slats. The first or second hinge element may also include a reciprocal arcuate channel for slidably and pivotably receiving the hook portion therein.

The slat assembly may include a stop element for limiting relative pivotal movement of the hook portion in a clockwise and/or anti-clockwise direction within the arcuate channel. The stop element extends upwardly from the lower surface of the slat and at least in part defines the arcuate channel. In this manner, the stop element may abut a portion of the hook portion when the slat assembly is in the extended and/or retracted positions.

In a second aspect, the disclosure incudes a roll top cover for operably covering the cargo bed of a vehicle, wherein the roll top cover comprises the slat assembly of the aforementioned aspect.

Particular advantages of the slat assembly include providing an improved sealing arrangement so as to be substantially weather resistant and/or impervious to the ingress of fluids, dust and the like therethrough and into the associated cargo bed of a vehicle. A further advantage resides in the provision of reduced frictional forces that are produced between individual slats during operation of the roll top cover so as to allow for easier and smoother opening and/or closing thereof.

FIGS. 1 to 6 illustrate a slat assembly 10. As illustrated in FIG. 1, the slat assembly 10 is configured for being a part of a roll top cover 1 for covering a cargo bed 110 of a vehicle 100. The slat assembly 10 is specifically configured for movement between an open or retracted position and a closed or extended position, as illustrated by FIG. 1.

Figure 2:
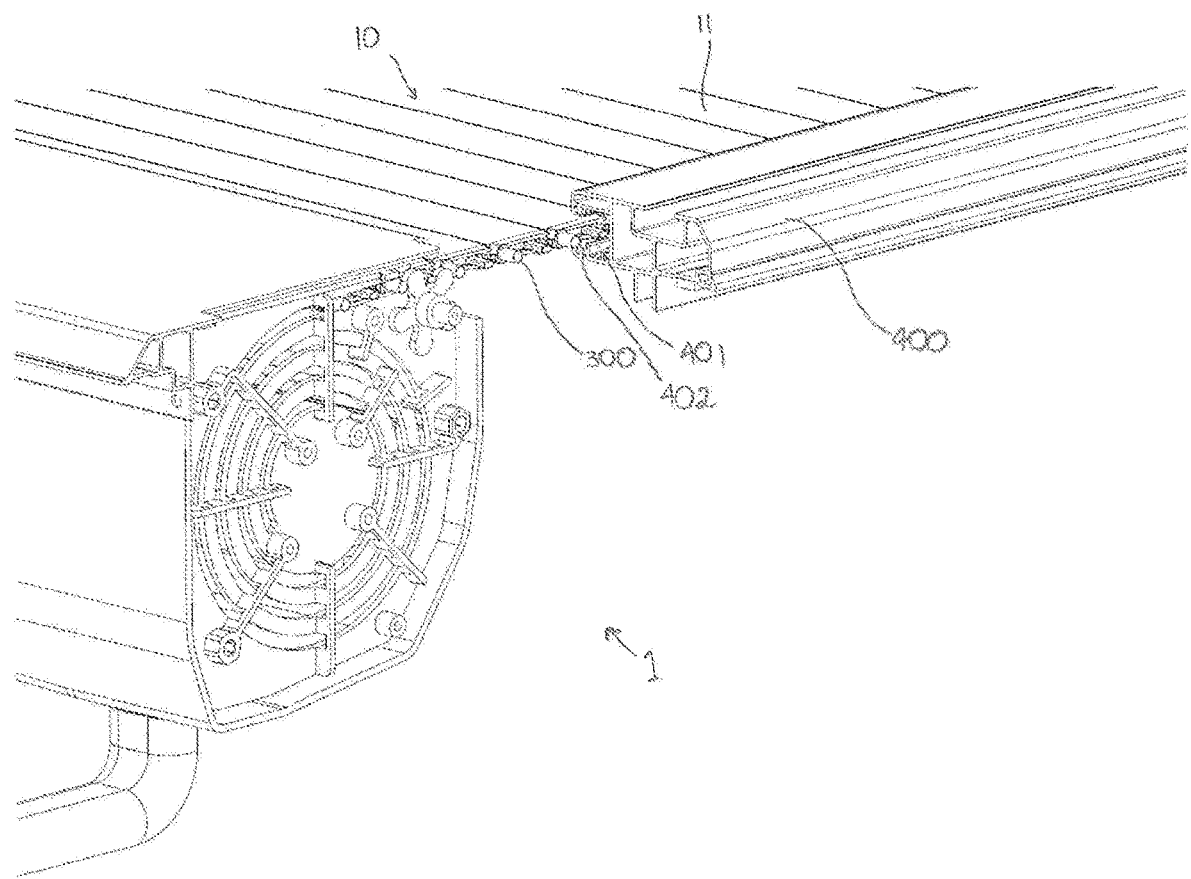
FIG. 2 illustrates a perspective view of the slat assembly of FIG. 1 as part of the roll top cover prior to installation on a vehicle.
Figure 3:
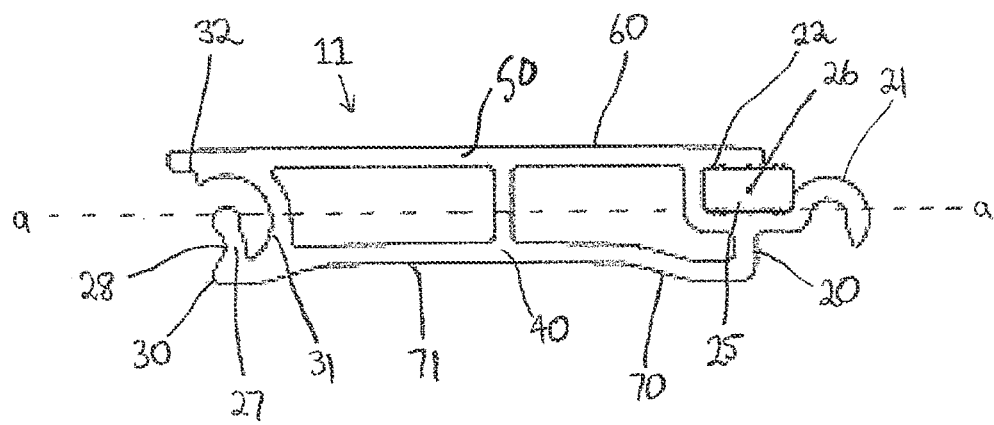
FIG. 3 is a side view of an individual slat of the slat assembly of FIG. 1.
Figure 4:
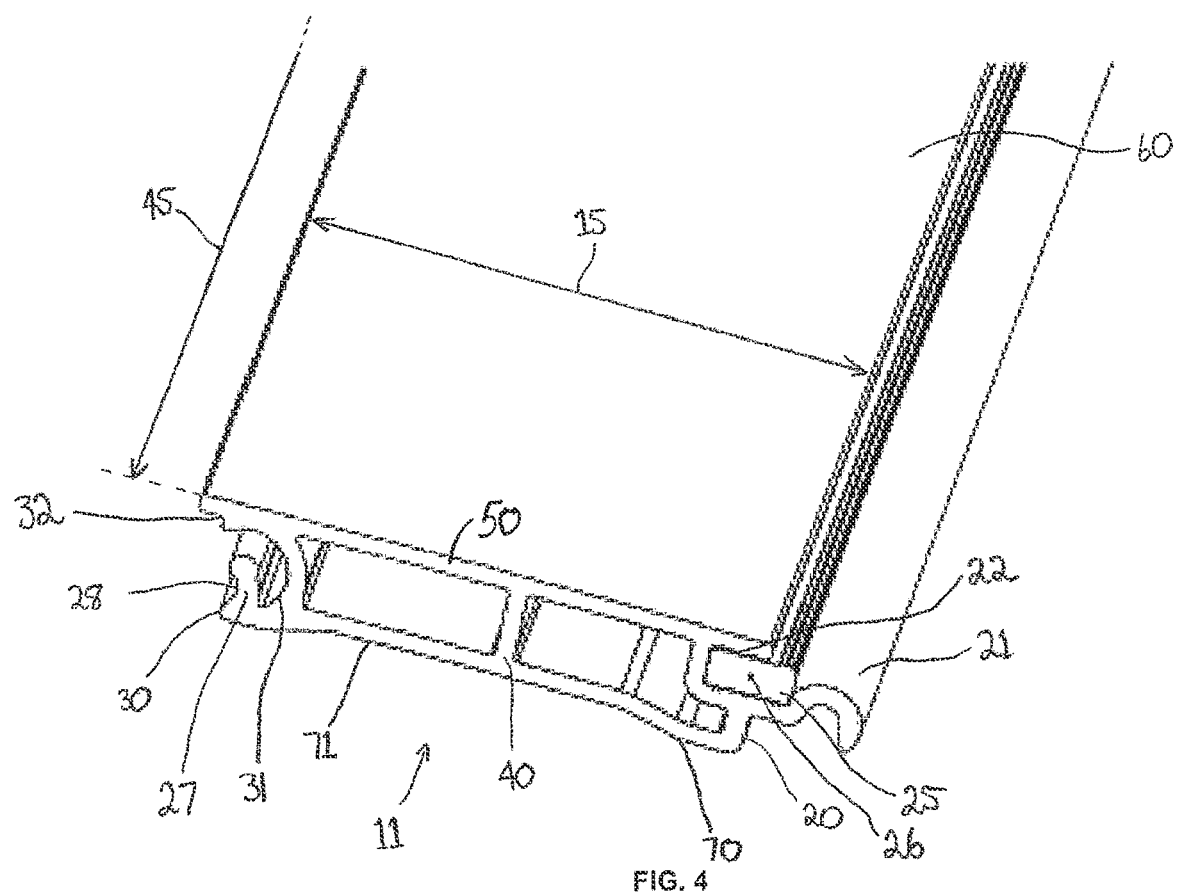
FIG. 4 illustrates a top-down perspective view of an individual slat of the slat assembly of FIG. 1.
Figure 5:
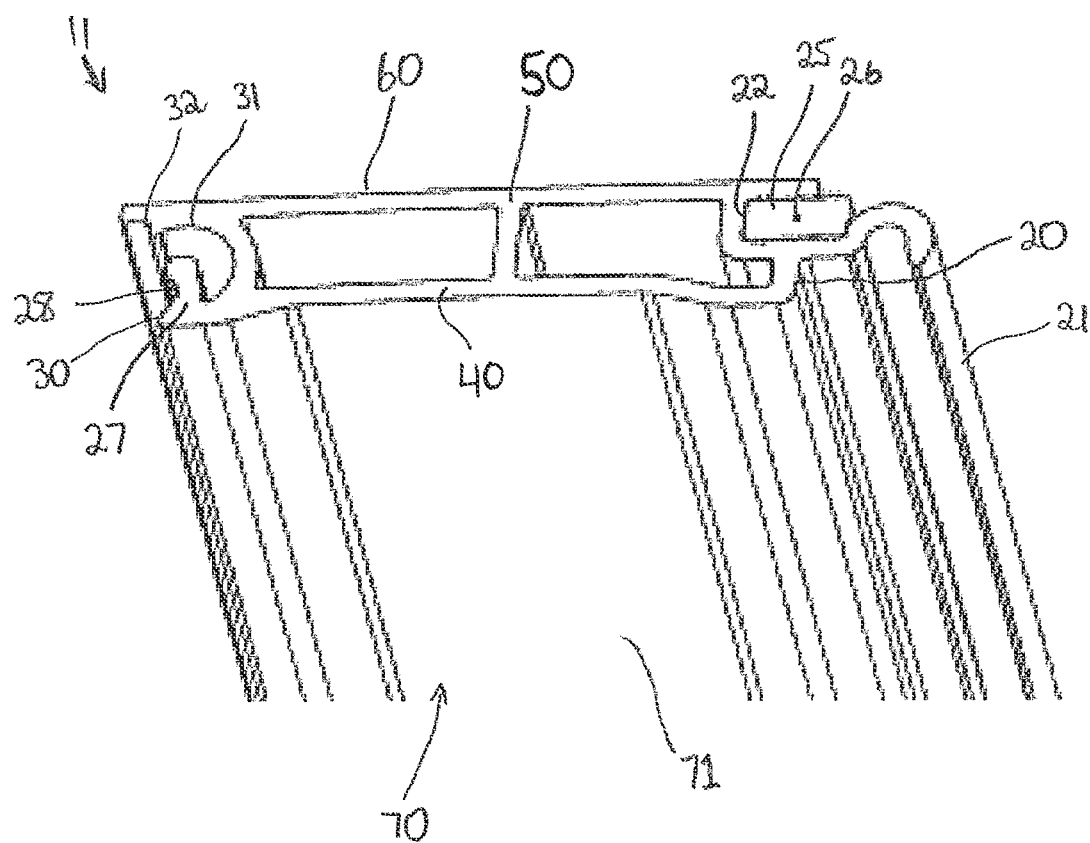
FIG. 5 illustrates a bottom-up perspective view of an individual slat of the slat assembly of FIG. 1.
Figure 6:
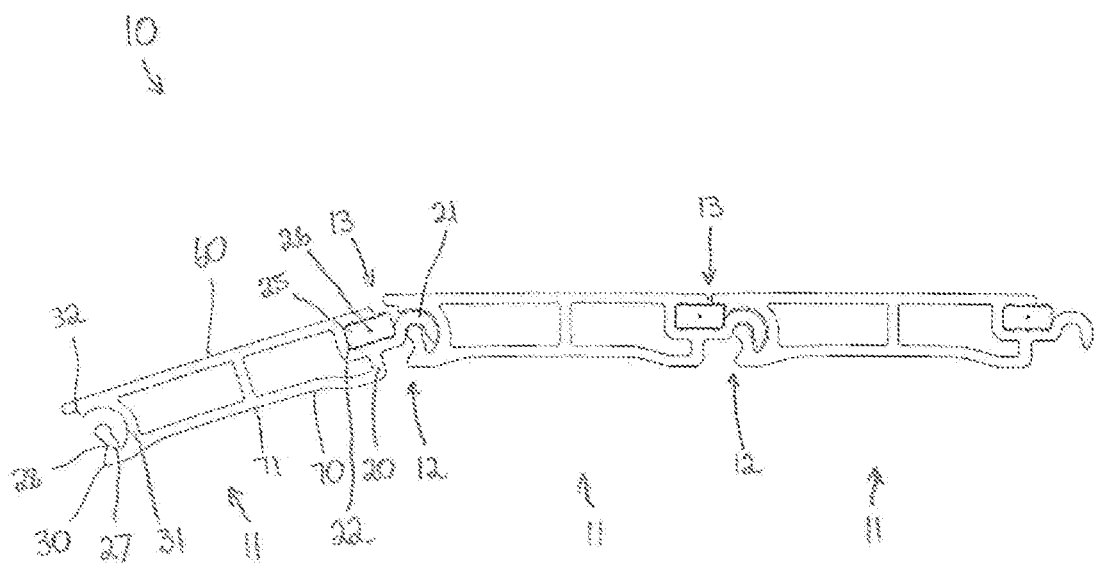
FIG. 6 provides a side view of a number of interconnected slats of the slat assembly of FIG. 1.

As can be observed in FIGS. 1, 2 and 6, the slat assembly 10 is constructed of a plurality of successive and interconnected slats 11. The slats 11 may be made or constructed from any suitable material known in the art, including, but not limited to, metals such as aluminium (e.g., marine grade aluminium) and steel, and polymeric materials, such as plastics (e.g., reinforced plastics). To this end, the slats 11 are preferably of dimensions so as to be appropriately strong as well as light weight for the slat assembly 10. The slat assembly 10 can include as many slats 11 as are required to cover various sizes of the cargo bed 110, as are known in the art.

Referring to FIGS. 3 to 6, each of the slats 11 has a first end 20 and a second end 30 that define a width 15 of the slat 11 therebetween and further define an axis a. The slats further include first and second sides 40,50 that define a length 45 of the slat 11 therebetween. The first and second sides 40,50 are both open ended to define a space therebetween. In this manner, each of the sides 40,50 is further capable of engaging a respective drive chain element 300 thereon so as to be operably connected to a drive chain track 401 of a side rail 400. In addition, the first and second sides 40,50 are preferably substantially flattened or planar therealong. Such an arrangement, advantageously acts to reduce or minimise any gap or space between the sides 40,50 of the slat 11 and a respective portion of the side rail 400 when engaged thereto by way of the drive chain element 300 to minimise the likelihood of fluids, dust or the like migrating therebetween and/or splashing from a side rail guttering system 402 and into the cargo bed 110 of the vehicle 100. This is in direct contrast to the curved side profiles present on prior art slats, which is a known shortcoming thereof.

As shown in FIGS. 3 to 6, each of the plurality of slats 11 has a substantially flattened upper surface 60. It will be appreciated that the upper surface 60 of the slats 11 need not necessarily be flattened or planar, but may be, for example, arcuate or domed in shape. An opposed lower surface 70 of the slats 11 further includes a flattened portion 71.

From FIG. 6, the respective first and second ends 20,30 of adjacent slats 11 define a hinge arrangement 12 for operably interconnecting said adjacent slats 11. In this manner, the slat assembly 11 is operable by way of the hinge arrangement 12 to move to the extended position in which the plurality of slats 11 are arranged so as have the respective upper surfaces 60 substantially flush there together and thereby define a substantially flattened or planar arrangement of the slats 11 of the slat assembly 10 (i.e., to restrict access to the underlying cargo bed 110), whilst also being operable for relative pivotal movement therebetween so as to attain a substantially curved or circular arrangement of the slat assembly 10, which allows a user access to the cargo bed 110 thereunder (i.e., the retracted position).

In this regard, each first end 20 comprises a domed or arcuate latch or hook portion 21 that extends radially the length of the slat 11 and axially outwards therefrom. The second end 30 includes a tapered and arcuate channel 31 that also extends radially the length of the slat 11, which is configured for matingly and pivotally receiving the respective hook portion 21 of the adjacent slat 11 therein. Advantageously, this arrangement of the arcuate channel 31 and the hook portion 21 allows for the secure engagement of the plurality of slats 11 there together. Further, the hook portion 21 and the arcuate channel 31 being integral with the slat 11 itself provides additional security and strength to the slat assembly 10 itself. Moreover, the mating engagement of the hook portion 21 with its respective arcuate channel 31 allows for the hinge arrangement 12 to be operable at low or reduced frictional forces during movement of the slat assembly 10 between the extended position and the retracted position and vice versa.

The hinge arrangement 12 is also configured to act as a mechanical hard end stop for the slat assembly 10 and by extension, each individual slat 11, when in the extended position and the retracted position. In this regard, the second end 20 of each slat 11 includes an abutting element 27 that extends upwardly from the lower surface 70 thereof and that defines in part the arcuate channel 31. During movement of the slat assembly 10 to the extended position, relative upward pivotal movement of the slat 11 translates to clockwise and relative pivotable and sliding movement of the respective hook portion 21 thereof within and into the arcuate channel 31 of the respective adjacent slat 11 until a point at which a distal or free end of the hook portion 21 contacts or abuts a base portion of the abutting element 27 at an end portion of the arcuate channel 31. Conversely, movement of the slat assembly 10 to the retracted position provides for relative downward pivotal movement of the slat 11, which results in anti-clockwise and relative pivotable and sliding movement of the respective hook portion 21 thereof within and out of the arcuate channel 31 of the respective adjacent slat 11 until a point at which a proximal end of the hook portion 21 contacts or abuts a concave stop portion 28 of the abutting element 27.

As illustrated in FIGS. 3 to 6, the plurality of slats 11 further include a U-shaped bracket or channel 22 disposed in the first end 20 between the upper surface 60 and the hook portion 21 so as to open axially therefrom. Disposed within the U-shaped channel 22 is a sealing member 25 that is dimensioned and positioned so as to substantially occupy the space defined thereby and extend outwardly therefrom. The U-shaped channel 22, as well as the sealing member 25 disposed and frictionally secured therein, extend substantially the length of the slat 11 so as to provide a sealing arrangement therealong between adjacent slats 11.

In this manner, the sealing member 25 is shown to abut a proximal end of the adjacent hook portion 21 and extends outwardly or axially from the overlying upper surface 60 to thereby define a stepped arrangement therewith. By virtue of this arrangement, the proximal end of the adjacent hook portion 21 acts to retain the sealing member 25 within the U-shaped channel 22. As can be observed from FIGS. 3 to 6, the second end 30 of the slat 11 further includes a step portion 32 configured to contact and abut an upper end portion of the sealing member 25 of the respective adjacent slat 11 when in a substantially parallel and planar arrangement relative thereto (i.e., the extended position).

The present sealing member 25 advantageously imparts little or no effect on the operational forces required to move the slat assembly 10 between the extended position and the retracted position and vice versa. In this regard, the sealing member 25 simply underlies and abuts a junction 13 defined by the respective first and second ends 20,30 of adjacent slats 11 when the slat assembly 10 is in the extended position rather than also being operably involved in the hinge arrangement 12 therebetween.

In addition to the above, each sealing member 25 preferably includes one or more resiliently deformable ridges or projections (not shown) on an outer surface thereof to assist in sealing the junction 13 between adjacent slats 11. To this end, the ridges or projections (not shown) are configured to deform so as to tolerate small imperfections (if any) in a surface of the U-shaped channel 22 and the step portion 32 when contacted therewith without compromising the function of the sealing member 25 with respect to effectively sealing the junction 13 between adjacent slats 11.

It will be appreciated that the sealing member 25 may comprise any suitable material known in the art, including rubber materials of a suitable grade and shore hardness. Preferably, the material to be used for the sealing member 25 demonstrates adequate levels of fluid and/or chemical resistance as well as frost and heat resistance. Additionally, the material to be used for the sealing member 25 suitably demonstrates a requisite level of flammability and UV resistance as typically required for automotive applications. The sealing member 25 is substantially rectangular in shape and preferably includes one or more reinforcing elements 26, such as reinforced metal particles (e.g. rods, particle strands, etc.) for adding a desired level of rigidity to the sealing member 25. Additionally, the reinforcing elements 26 preferably act to reduce any variance in length of the sealing member 25 produced by, for example, temperature changes. The reinforcing elements 26 also suitably minimise the likelihood of the seal member 25 stretching as part of the cutting and assembly process for the slat assembly 10 described herein.

In addition to contributing to the overall security of the slat assembly 10, the hinge arrangement 12 also contributes to the fluid and dust proofing thereof. By way of example, in the unlikely event that any fluid, dust or the like were to negotiate past the sealing member 25, this foreign material would then be required to traverse, not one, but two upwardly curved profiles or portions of the hook portion 21 at respective proximal and distal ends thereof. It would be appreciated, that in such a situation, then the fluid, dust or the like would travel radially towards the respective first and second sides 40,50 of the slats 11 and into an adjacent side rail guttering system 402. As a result of this arrangement, there is no direct pathway for fluid, dust or the like to migrate from outside of the slat assembly 10 through the hinge arrangement 12 and into the cargo bed 110 of the vehicle 100.

The above description is provided for purposes of description to one of ordinary skill in the related art. It is not intended to be exhaustive or to limit the invention. As mentioned above, numerous alternatives and variations to the present disclosure will be apparent to those skilled in the art of the above teaching. Accordingly, while some alternative features have been discussed specifically, other features will be apparent or relatively easily developed by those of ordinary skill in the art. The disclosure is intended to embrace all alternatives, modifications, and variations of the present disclosure that have been discussed herein, and others that fall within the spirit and scope of the above described disclosure.

The invention claimed is:

1. A slat assembly for a roll top cover comprising:
   a plurality of successive and interconnected slats, each of the slats comprising opposed and adjoining first and second ends and upper and lower surfaces;
   a first hinge element disposed at the first end of each of the slats and integral therewith, the first hinge element comprising an arcuate hook portion extending from the first end away from the second end;
   a second hinge element disposed at the second end of each of the slats and integral therewith, the second hinge element comprising a reciprocal arcuate channel between congruent arcuate surfaces for slidably and pivotably receiving the hook portion therein; and
   a sealing member secured to the first end of at least one of the slats, the sealing member configured for underlying a junction defined by the first end of the at least one of the slats and the second end of another slat of the slats that is adjacent to the at least one of the slats;
   wherein the first and second hinge elements are configured to define a hinge arrangement that facilitates relative pivotal movement between the slats; and
   wherein the slat assembly is operable between extended and retracted positions.

2. The slat assembly of claim 1, wherein the first end of the at least one of the slats comprises a channel disposed between the upper surface and the first hinge element of the at least one of the slats, the channel external of the arcuate hook portion, the sealing member secured in the channel.

3. The slat assembly of claim 1, wherein the second end of the another slat of the slats that is adjacent to the at least one of the slats comprises a step portion configured to contact and abut an upper end portion of the sealing member.

4. The slat assembly of claim 1, wherein the sealing member comprises a plurality of resiliently deformable ridges disposed thereon.

5. The slat assembly of claim 1, further comprising a stop element for limiting relative pivotal movement of the hook portion in a clockwise or anti-clockwise direction within the arcuate channel.

6. The slat assembly of claim 5, wherein the stop element extends upwardly from the lower surface of the slat and at least in part defines the arcuate channel.

7. The slat assembly of claim 5, wherein the stop element abuts a portion of the hook portion when the slat assembly is in the extended or retracted positions.

8. The slat assembly of claim 1, wherein the sealing member abuts the second end of the another slat of the slats that is adjacent to the at least one of the slats in the extended position, and the sealing member is spaced from the second end of the another slat of the slats that is adjacent to the at least one of the slats in the retracted position.

9. The slat assembly of claim 1, wherein the sealing member includes a reinforcing element.

10. The slat assembly of claim 9, wherein the sealing member surrounds the reinforcing element.

11. The slat assembly of claim 2, wherein the sealing member extends outward from the channel toward the arcuate hook portion of the first hinge element of the at least one of the slats.

12. The slat assembly of claim 3, wherein the step portion abuts and extends along a top surface and a side surface of the sealing member in the extended position.

13. The slat assembly of claim 1, wherein the sealing member is between the arcuate hook portion and the second end.

* * * * *